United States Patent
Desmarais et al.

(10) Patent No.: US 11,046,298 B1
(45) Date of Patent: Jun. 29, 2021

(54) LOAD SENSING WHEEL CHOCKS

(71) Applicant: Altec Industries, Inc., Birmingham, AL (US)

(72) Inventors: Jordan A. Desmarais, Smithville, MO (US); David F. Lindquist, Cameron, MO (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 17/112,185

(22) Filed: Dec. 4, 2020

(51) Int. Cl.
*B60T 3/00* (2006.01)
*B60T 17/22* (2006.01)
*G01G 19/02* (2006.01)

(52) U.S. Cl.
CPC .............. *B60T 17/221* (2013.01); *B60T 3/00* (2013.01); *G01G 19/021* (2013.01)

(58) Field of Classification Search
CPC ...... B60T 3/00; G01G 19/025; G01G 19/027; G01G 19/52; B65G 69/005; B65G 69/003
See application file for complete search history.

(56) References Cited

U.S. PATENT DOCUMENTS

| | | | | |
|---|---|---|---|---|
| 3,961,675 A | * | 6/1976 | Siegel | G01G 19/445 177/126 |
| 5,086,856 A | * | 2/1992 | Haggstrom | G01G 19/445 177/1 |
| 5,994,649 A | * | 11/1999 | Garfinkle | G01G 19/44 177/126 |
| 7,226,265 B2 | | 6/2007 | Wilson | |
| 9,539,995 B2 | | 1/2017 | Metz et al. | |
| 10,260,934 B2 | * | 4/2019 | Esmail | G01G 19/52 |
| 2009/0194751 A1 | * | 8/2009 | Schmucker | B66F 5/02 254/8 R |
| 2013/0223048 A1 | * | 8/2013 | Jeong | B65G 69/005 362/183 |
| 2015/0122555 A1 | * | 5/2015 | Meeks | G01G 19/44 177/126 |
| 2016/0107620 A1 | * | 4/2016 | Humphrey | G05D 1/0297 701/2 |
| 2016/0159226 A1 | * | 6/2016 | Tsukamoto | B60L 11/182 701/22 |
| 2017/0350749 A1 | * | 12/2017 | Alonso Tabares | G01M 1/125 |

* cited by examiner

*Primary Examiner* — Nicholas J Lane (74) *Attorney, Agent, or Firm* — Erise IP, P.A.

(57) ABSTRACT

A wheel chock system comprising at least one wheel chock for supporting a vehicle, detecting a load imparted by the vehicle, and displaying information indicative of the load imparted by the vehicle is described herein. In some embodiments, the wheel chock detects a load imparted by a vehicle with a load sensor and displays the load. The wheel chock may be in communication with other wheel chocks supporting the vehicle. The wheel chocks may display the loads detected by all wheel chocks and may determine and display a load distribution across all wheel chocks.

20 Claims, 4 Drawing Sheets

LOAD SENSING WHEEL CHOCKS

BACKGROUND

1. Field

Embodiments of the invention relate to wheel chocks for supporting a vehicle on an unlevel surface. Specifically, embodiments of the invention relate to wheel chocks with integrated load cells for measuring the load of a vehicle on an unlevel surface.

2. Related Art

In typical systems, an aerial device may be configured with utility platforms, material handlers, crane winches, tree fellers, and any other utility implement that may be attached to the end of a boom of the aerial device. In some scenarios the aerial device may be stationed on an unlevel surface when performing work. Performing work on uneven or unlevel ground presents several challenges. When the boom of the aerial device is extended, the center of gravity of the aerial device may shift. Great care must be taken by the operator to ensure that the weight distribution of the aerial device is within specifications of the vehicle.

Typically, outriggers are deployed to allow for boom operations on level ground and on inclined surfaces. The outriggers provide a wide stable base to allow the boom to be extended beyond the side of the aerial device. However, when the aerial device is parked on an incline, a side force may be imparted on the outriggers due to the incline. The side force may impart a torque and a shear force through the outrigger. Typical outriggers are not designed for side and torque loads.

Typically, wheel chocks may be used in combination with the outriggers to reduce the side force and the torque imparted on the outriggers. When the aerial device is parked on an incline, wheel chocks may be placed under the tires of the vehicle to receive at least a portion of the load from the vehicle. By receiving at least a portion of the load in the wheel chocks, the lateral load and the torque on the outriggers is reduced. However, typically, this is done by aerial device operators who place the chocks and have no way of knowing what actual force, if any, is imparted on the wheel chocks. Further, as the boom is rotated, there is no way of knowing if the force distribution is maintained within operational limits or if the load distribution changes across the wheel chocks. The changing forces as the boom is moved may impart more lateral forces and torques on the outriggers without the operator's knowledge.

What is needed is a wheel chock system for determining the load on each wheel chock and, consequently, a load distribution. The load on the wheel chocks can be monitored to ensure that the operational load limits are maintained. Monitoring the load on the wheel chocks allows the operator to operate the boom while maintaining operational conditions within the specifications of the vehicle.

SUMMARY

Embodiments of the invention solve the above-mentioned problems by providing a wheel chock system that detects a load on each wheel chock placed under the tires of a vehicle. The load under each wheel chock may be combined to determine a load distribution of the vehicle on the wheel chocks. A first embodiment of the invention is directed to a wheel chock system for supporting a vehicle and measuring a load imparted on the wheel chock by the vehicle, the wheel chock system comprising at least one wheel chock, comprising a surface for receiving a tire of the vehicle and supporting the vehicle, a sensor for measuring the load on the at least one wheel chock imparted by the vehicle, and a display on a first side of the at least one wheel chock displaying the information indicative of the load.

A second embodiment of the invention is directed to a wheel chock system for supporting a vehicle and measuring a load imparted on the wheel chock by the vehicle, the wheel chock system comprising a plurality of wheel chocks, each wheel chock of the plurality of wheel chocks comprising a sensor for measuring the load imparted by the vehicle on each wheel chock, at least one processor for receiving a first signal from the sensor and sending a second signal comprising information indicative of the load, and a transmitter for transmitting the second signal indicative of the load measured by the sensor, a receiver for receiving the second signal indicative of the load measured by the sensor, and a display for displaying the load measured at each wheel chock of the plurality of wheel chocks.

A third embodiment of the invention is directed to a method of supporting a vehicle on a slanted surface, the method comprising the steps of providing at least one wheel chock comprising a surface for receiving a tire thereon, and a sensor for measuring a load on the at least one wheel chock, placing the surface adjacent a tire of the vehicle, detecting the load imparted by the vehicle using the sensor, sending a first signal indicative of the load from the sensor to at least one processor, sending a second signal comprising information indicative of the load from the processor to a display, and displaying the information indicative of the load on the display.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

In general, a wheel chock system for determining a load applied to one or more wheel chock is described in embodiments herein. The load on the wheel chocks can be monitored to ensure that the operational load limits of a vehicle imparting the load are maintained. Monitoring the load on the wheel chocks allows the operator to operate the boom while maintaining operational conditions within the specifications of the vehicle. Further, the load on the wheel chocks may be monitored to ensure that acceptable loads on the outriggers are maintained.

Figure 1:
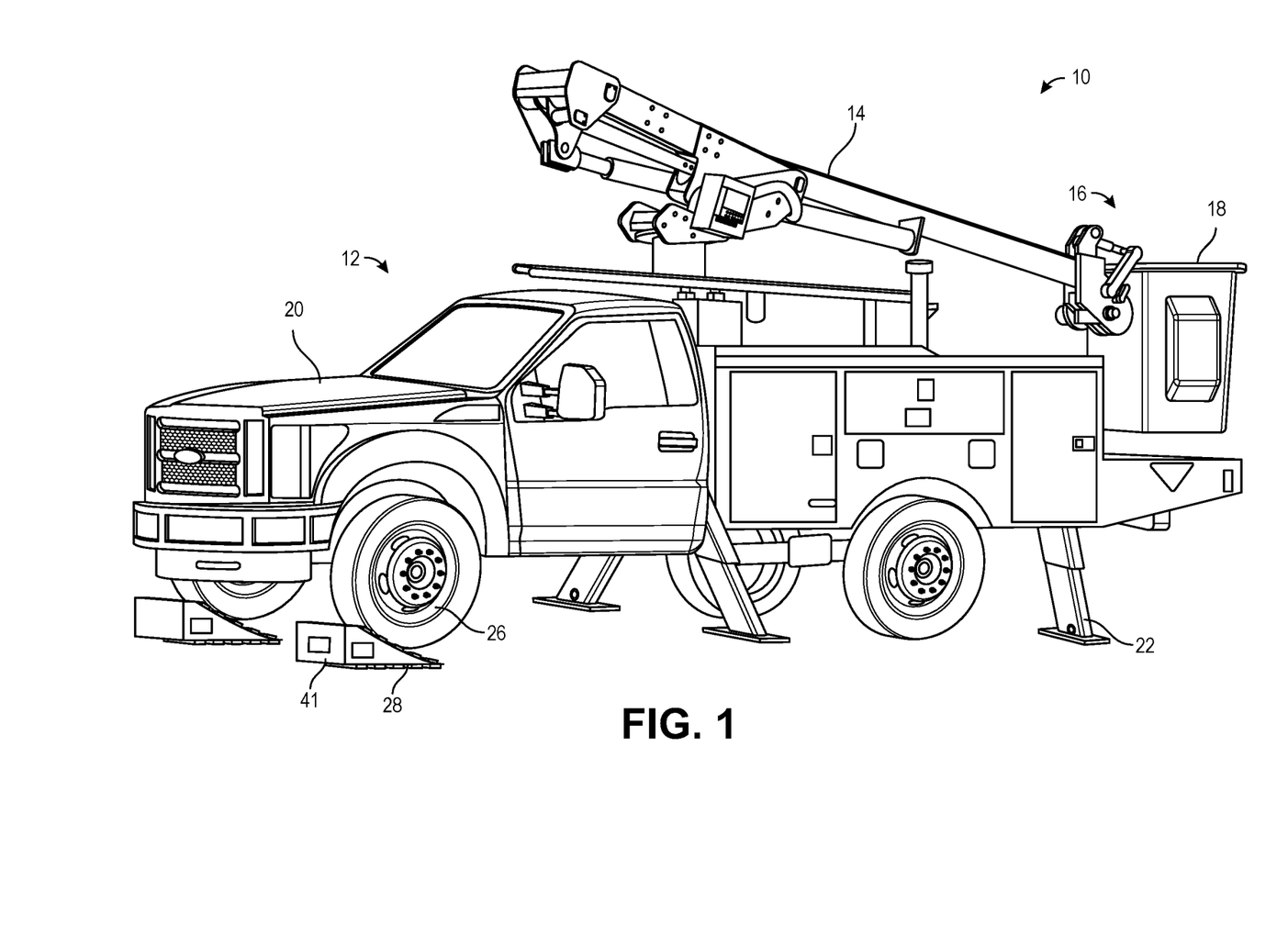
FIG. 1 depicts a perspective view of a utility vehicle with wheel chocks placed under the tires of the utility vehicle.

An aerial device 10 is shown in FIG. 1. The aerial device 10 generally comprises a base 12 with a boom assembly 14 rotatably mounted thereto. An implement 16, such as a utility platform assembly 18 or other implement for performing work, is disposed on the boom assembly 14 to facilitate the accomplishment of a task by a utility worker.

The base 12 of the aerial device 10 is a stabilized platform. In embodiments of the invention, the base 12 is a utility vehicle 20 (as illustrated in FIG. 1), a crane base, an oil rig, an earth-working machine, and any other vehicle that may use wheel chocks. In some embodiments, the utility vehicle 20 may be any vehicle such as an automobile that may park on an incline and utilize the wheel chocks as described herein. The base 12 provides stability and a counterweight to a load being supported by the boom assembly 14. Larger loads typically require a more stable and a heavier base. To achieve this stability, in embodiments of the invention, the base 12 may utilize hydraulic stabilizers, outriggers 22, and/or sandbags. In some embodiments, wheel chocks 28 may be used when the vehicle is resting on an incline as described in embodiments below.

FIG. 1 depicts the utility vehicle 20 with outriggers 22 deployed and a plurality of the wheel chocks 28 placed under tires 26. In some embodiments, the wheel chocks 28 may be used when the utility vehicle 20 is resting on an incline as described in embodiments below. A wheel chock 28 may be placed under the tire 26 of the utility vehicle 20 to reduce side force and torque that may be applied to the outriggers 22. In some embodiments, the wheel chock 28 may be placed under the two front tires, the back tires and/or both.

In some embodiments, the wheel chocks 28 are placed under the tires 26 of the utility vehicle 20 to absorb force from the weight of the utility vehicle 20 forcing the utility vehicle 20 down the incline. When there are no wheel chocks utilized, the outriggers 22 take the full force of the utility vehicle 20 on the incline. The outriggers 22 are designed to withstand the load generated by the boom assembly 14 extended over the side of the utility vehicle 20. However, the outriggers 22 may not be designed to additionally withstand the force of holding the utility vehicle 20 on an incline. Typically, outriggers are specifically designed for longitudinal forces along the extension axis of the outriggers 22. The outriggers 22 are typically extended laterally (to the side) to the utility vehicle 20. The boom assembly 14 is also extended laterally to the utility vehicle 20. Therefore, little to no torque is exerted on the outriggers 22. However, in some scenarios, it may be necessary for the utility vehicle 20 to be parked on an incline to perform required work.

Operational methods and materials may be required to use wheel chocks 28. Typically, tire 26 diameter is based on the weight of the vehicle 20. The wheel chock 28 curvature of the curved face 30, depicted in FIG. 2 may be based on the curvature, or diameter, of the tire 26. In some embodiments, the curved face 30 of the wheel chock 28 may instead be flat or any other shape. The wheel chock 28 may include urethane, rubber, or any other material that may meet minimum regulatory specifications. The wheel chock 28 described herein, in some embodiments, may meet the specifications required by Mine Safety and Health Administration (MSHA), Occupational Safety and Health Administration (OSHA), Society of Automotive Engineers (SAE), National Fire Protection Agency (NFPA), and state and federal Department of Transportation (DOT).

Further, the placement and use of the wheel chocks 28 may conform to the requirements of the regulatory departments stated above. For example, the operator of the utility vehicle 20 may drive the utility vehicle 20 onto a slope and check the angular measurements of the utility vehicle 20 on the slope. The operator may measure the angle of the utility vehicle 20 using inclinometers to determine that the grade of the incline is within operational limits of the utility vehicle 20. When the operator determines that the incline grade is within operation limits, the operator may engage the parking brake of the utility vehicle 20. The wheel chocks 28 may then be placed under the tires 26. When the wheel chocks 28 are in place, the operator returns to the cab and releases the parking brake. The utility vehicle 20 then rolls back onto the wheel chocks 28 such that the wheel chocks 28 prevent the utility vehicle 20 from rolling down the hill. When the utility vehicle 20 is stationary with the wheel chocks 28 preventing the utility vehicle 20 from rolling, the operator again engages the parking brake of the utility vehicle 20. The utility vehicle 20 is then supported by both the wheel chocks 28 and the parking brake.

Next, the operator may extend the outriggers 22. The outriggers 22 may be placed on a large surface area platform and pressed into the ground. As the outriggers 22 are pressed down, the load on the wheel chocks 28 may slightly decrease. The operator may only adjust the outriggers 22 until a small amount of load is taken from the wheel chocks 28. This allows the wheel chocks 28 to prevent the utility vehicle 20 from rolling downhill while the lateral loads of the boom assembly 14 extension are received by the outriggers 22.

In some embodiments, the wheel chock 28 may be used under each wheel of the utility vehicle 20. In some embodiments, any number of wheel chocks 28 may be used based on need or the number of wheels of the utility vehicle 20. In most cases, either two or four wheel chocks 28 may be used.

In some embodiments, the wheel chocks 28 may be a set of four and may communicate wirelessly as described below.

Figure 2:
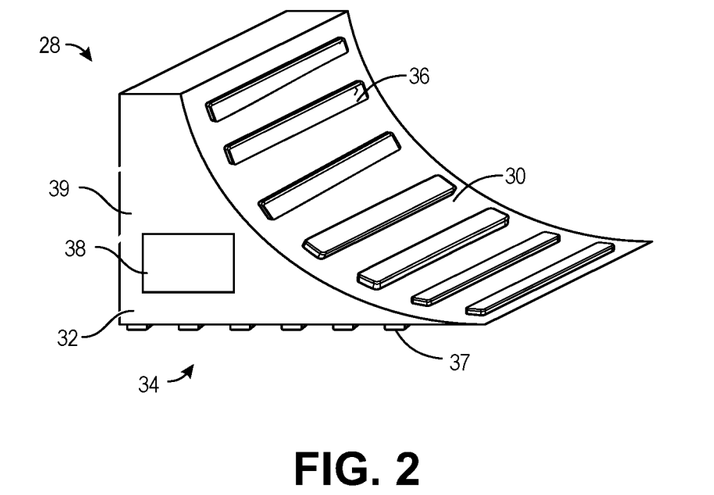
FIG. 2 depicts an embodiment of a wheel chock with a display.

FIG. 2 depicts an exemplary wheel chock 28 that may be used in embodiments of the wheel chock system. In some embodiments, the wheel chock 28 may comprise a generally triangular cross-section with a curved face 30. An angle 32 may be opposite the curved face 30 with a flat base side 34 for resting on the ground. In some embodiments, the angle 32 may be a right angle, an acute angle, or an obtuse angle, as various angles may provide benefits depending on the incline and the intended use.

The curved face 30 of the wheel chock 28 may be configured to receive a tire 26 of any general vehicle and may comprise a textured surface 36 for increased friction and/or traction between the wheel chock 28 and the tire 26. In some embodiments, the textured surface 36 may comprise spaced apart longitudinal raised treads, as shown in FIG. 2. In other embodiments, the textured surface 36 may comprise a pattern of bumps, projections, and/or ridges. The wheel chock 28 may comprise at least one of plastic, rubber, and/or metal and may be specifically designed for expected loads imparted by the aerial device 10. In some embodiments, the curved face 30 may be covered with a rubber material for traction against the tire 26 of the utility vehicle 20. In some embodiments, the curved face 30 may instead be flat. The flat face of the wheel chock 28 may present a flat surface for receiving the tire 26. The flat surface may comprise any textures and/or materials on the surface as described herein. The base side 34 of wheel chock 28 may also include a textured surface 37, such as a spaced apart longitudinal raised treads for increasing friction and/or traction with the ground surface.

The wheel chock 28 may be portable and lightweight such that the wheel chock 28 may be moved by hand. In some embodiments, the exterior of the wheel chock 28 may comprise at least one handle for easy lifting. In some embodiments, the wheel chock 28 comprises a display 38 for displaying any information or data to the operator. The display 38 is preferably on a side surface 39 that is configured to face outwardly when placed in contact with the tire 26. In some embodiments, the wheel chock 28 may include a plurality of displays 38, which may be located on one or both side surfaces, and/or the front surface 41 opposite from the curved face 30.

Figure 3A:
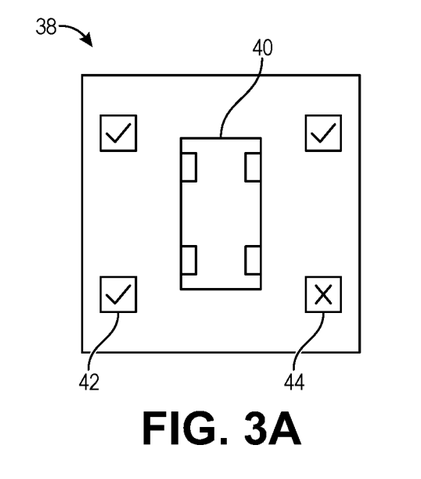
FIGS. 3A-B depicts embodiments of a wheel chock display.
Figure 3B:
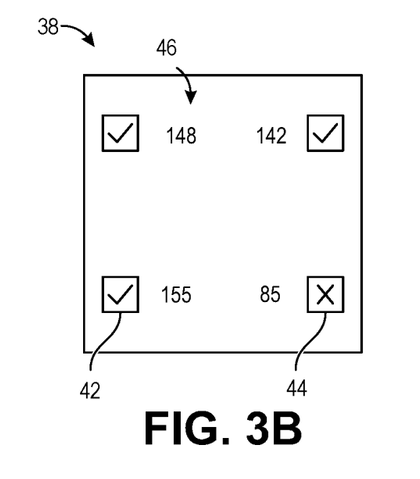

FIGS. 3A-B depicts embodiments of the display 38. The display may present a graphic 40 of the vehicle 20 and indicia indicating a status of the load on each wheel chock 28. As shown in the exemplary embodiment in FIG. 3A, the first indicator 42 indicates that the load on the wheel chock at the corresponding location of the graphic 40 is within specification. In some embodiments, the first indicator 42 may be shown as a checkmark in the box. In other embodiments, other methods of indication may be provided. Further, in some embodiments, the second indicator 44 indicates that the load on the wheel chock 28 at the corresponding location of the graphic 40 of the vehicle 20 is out of specification. In some embodiments, the second indicator 44 may be shown as an "X" in the box. The operator may view the display 38 and easily recognize that that the load needs to be changed so that all wheel chocks 28 are within the specifications.

At FIG. 3B, another exemplary embodiment of the display 38 is depicted. Here, specific measured loads 46 for each wheel chock 28 are presented. Again, the first indicator 42 presents a checkmark. Further, next to the first indicator 42 is the actual load amount, such as "155," corresponding to the wheel chock 28 represented by the first indicator 42. The load amount is consistent, or within an acceptable range, with the other load amounts ("142" and "148") except for the load amount next to the second indicator 44 depicting the "X." The load amount next to the second indicator 44, which indicates an unacceptable amount, is "85." Because there is an inconsistency, the load must be changed. The load may be out of specification. Further, the unbalanced load may be taken by the outrigger 22 near the wheel chock 28 represented by the second indicator 44. In some embodiments, an indication of each individual wheel chock may be displayed or the loads on a plurality of wheel chocks 28 may be displayed.

Figure 4:
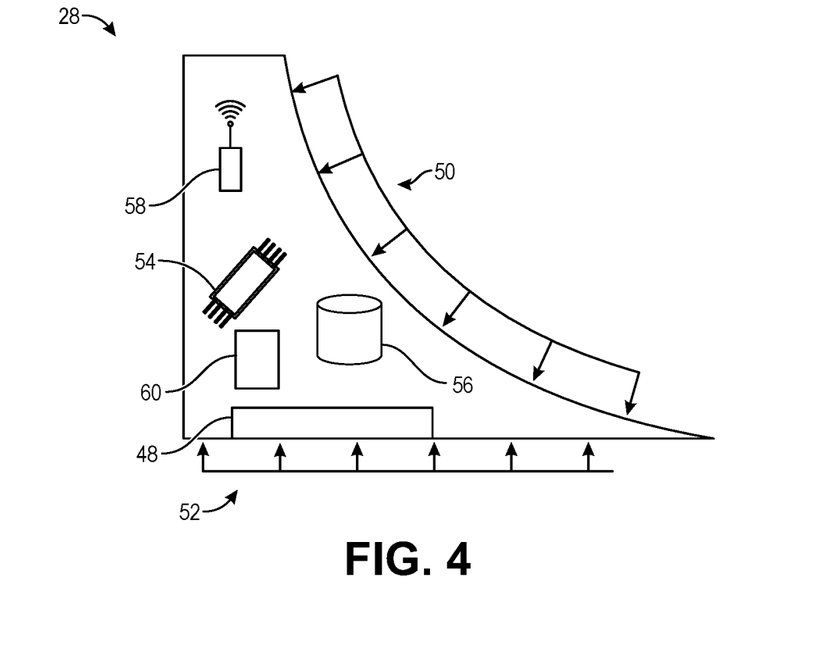
FIG. 4 depicts an exemplary hardware system for embodiments of the invention.

FIG. 4 depicts exemplary hardware for carrying out embodiments described herein. In some embodiments, the wheel chock 28 comprises a sensor 48 for measuring a vehicle force 50 or a ground reaction force 52. The force measured by the sensor 48 is indicative of the load imparted on the wheel chock 28 by the utility vehicle 20. In some embodiments, the sensor 48 may be a load sensor. In other embodiments, the sensor 48 may be a pressure sensor or a force sensor.

In some embodiments, at least one processor 54 may access computer-executable instructions stored on at least one non-transitory computer-readable media. In some embodiments, the computer-executable instructions may be stored on the data store 56. The wheel chock 28 may comprise a transceiver 58 comprising a transmitter and receiver combination and may communicate either wired or wirelessly with the at least one processor 54. In some embodiments, the wheel chock 28 may include a transmitter, a receiver, or any combination for carrying out embodiments described herein. In some embodiments, the at least one processor may be a server communicating with a network. In some embodiments, the wheel chock 28 communicates wirelessly with the wheel chocks 28 via the transceiver 58. In some embodiments, one or more wheel chocks 28 comprises an additional receiver and receives data from one or more other wheel chocks 28.

In some embodiments, the sensor 48 may be disposed in the wheel chock 28 for measuring the load on the wheel chock 28 imparted by the vehicle 20. In some embodiments, the sensor 48 may be disposed directly above the ground (as shown) or directly under the curved face 30 of the wheel chock 28. The sensor 48 may be configured in the wheel chock 28 such that the full force from the weight of the utility vehicle 20 may be imparted on the sensor 48. In this way, the sensor 48 may measure the full force imparted by the utility vehicle 20. In some embodiments, the sensor 48 may be any force measuring sensor such as, for example, a load cell, a strain gauge, a pressure transducer, a displacement measurement sensor, and any other load measuring device. The sensor 48 may be disposed inside the wheel chock 28 and may be powered by a battery, or other portable power device 60, also disposed in the wheel chock 28 as described below.

In some embodiments, the sensor 48 may send an electrical signal indicative of the load on the wheel chock 28. The output signal of the sensor 48 may be indicative of the force imparted by the utility vehicle 20 and may be transmitted to the at least one processor 54 and/or shown on the display 38. The at least one processor 54 may access non-transitory computer-readable media storing computer-executable instructions for performing the processes described in embodiments herein. The signal from the sensor 48 may be processed to determine a load imparted by the utility vehicle 20 in typical units such as, for example, Newtons, pound-force, or any other force or pressure units.

The determined force imparted by the utility vehicle 20 may be compared with forces measured from the wheel chocks 28 to determine forces from the other wheel chocks supporting the utility vehicle 20 as described below.

In some embodiments, the signal output from the sensor 48 indicative of the load imparted from the utility vehicle 20 is transmitted wirelessly to other wheel chocks 28 supporting the utility vehicle 20. In some embodiments, the wheel chocks 28 are disposed below the utility vehicle 20 receiving at least a portion of the weight of the utility vehicle 20. At the wheel chocks 28, the data from the plurality of sensors in the wheel chocks 28 may be combined to determine the weight distributed to each wheel chock 28. In some embodiments, the load on each wheel chock 28 as well as a distribution may be displayed on the display 38 as described above.

In some embodiments, the transceiver 58 may be a wireless transmitter that transmits the signal from the sensor 48 and the output of the at least one processor 54. The at least one processor 54 may calculate the load, or information indicative of the load, and send the output as an electrical signal. The transmitter may transmit the output of the at least one processor 54 and the output signal of the sensor 48. The transmitter may transmit information indicative of the load imparted on the wheel chock 28 by the vehicle to other wheel chocks 28 supporting the utility vehicle 20 and to a remote receiver such as, for example, in the utility vehicle 20 cab or at any remote processing and display location. Further, information indicative of the load may be transmitted to a mobile device of the operator.

In some embodiments, the wheel chock 28 comprises a receiver, which may be part of the transceiver 58 or a separate element. The receiver may receive the signals transmitted from the other wheel chocks 28 supporting the utility vehicle 20. In some embodiments, the wheel chocks 28 communicate such that each wheel chock 28 processes data from the other wheel chocks 28. In this way, each wheel chock 28 may process and display information indicative of the loads on all the wheel chocks 28. Further, in some embodiments, the wheel chock 28 may comprise proximity sensors and GPS. Any data that is processed and transmitted between the wheel chocks 28 may also comprise positional data.

In some embodiments, the load imparted to each wheel chock 28 is determined at each wheel chock 28, then a signal indicative of the calculated load is sent to either all of the other wheel chocks 28 or a single master wheel chock 28 that processes and displays the data from the other wheel chocks 28. The load distribution is then determined at each wheel chock 28 and the load at each wheel chock 28 as well as a distribution may be displayed, such as on display 38.

In some embodiments, the signal from the sensor 48 or a calculated load for the wheel chock 28 is sent to a central processor and the load for each wheel chock 28 as well as the load distribution may be determined at the central processor. The central processor may be located at any one of the wheel chocks 28 and/or at the cab of the utility vehicle 20, a remote location, or any other remote location that may receive the data wirelessly for processing and display.

In some embodiments, the at least one processor 54 generates at least one signal based on the load distribution data from the plurality of wheel chocks 28 to send to at least one actuator. The actuators may control hydraulic, pneumatic, and electrical energy to move the aerial device 10 to redistribute the weight of the aerial device 10 on each tire 26.

In some embodiments, a power source 60 is disposed in the wheel chock 28 for powering any of the electrical components such as, for example, the at least one processor 54, the transceiver 58, the sensor 48, the display 38, the data store 56, and any other electrical components that may be electrically powered. The power source 60 may be a battery such that the wheel chock 28 is self-contained. In some embodiments, the power source 60 may be rechargeable and/or replaceable. This allows the wheel chock 28 to be portable and moved between various tires 26 and vehicles 20. In some embodiments, the power source 60 may be a power management system and may direct power to the electrical components and may shut down the wheel chock 28, or components of the wheel chock 28, when not in use for a predetermined amount of time.

In some embodiments, the wheel chocks 28 may utilize power from the utility vehicle 20. The wheel chocks 28 may comprise an electrical connector. The electrical connector may be any connector for receiving power from the utility vehicle 20. In some embodiments, the power management system conditions the power from the power input for use with the electrical components described herein.

In some embodiments, the display 38 on the wheel chock 28 may display the load imparted on each wheel chock as well as a representation of the load distribution of the utility vehicle 20 on wheel chocks 28. The display 38 may depict each wheel chock 28 location by displaying GPS coordinates as well as location relative to other wheel chocks 28 supporting the utility vehicle 20 and to the utility vehicle 20 which may also have a GPS sensor or proximity sensor. In some embodiments, the display 38 may also indicate the amount of power in the power source 60 associated with the wheel chock 28.

In some embodiments, the data from the sensor 48 and the data processed by the at least one processor 54 is stored in the data store 56 for further access and analysis. The data may be stored temporarily before being transmitted when transmission signal is weak or may be stored permanently for data analysis. For example, data may be stored and accessed for investigation. An outrigger may fail and upon analysis of the data, the weight distribution may be weighted towards a single wheel chock 28. In another example, the data may be automatically analyzed and determine that the load distribution is out of specification and a signal to an alarm was sent but the alarm was not activated. Consequently, a back-up alarm is activated, and a notification is sent that the alarm is faulty and needs to be replaced. The data may be stored at each individual wheel chock 28 or at the central database, in the vehicle 20 cab, or at a remote location.

In some embodiments, stored data may be tracked over time and used to update specifications. The data may be stored as historical data and compiled into chart to determine when accidents occur. Specifications may be updated based on data trends as described in the example presented below.

In some embodiments, an inclinometer is used to determine the incline of the wheel chock 28. The wheel chock 28 should be placed on the ground and the inclinometer may measure the angle of the ground. In some embodiments, the angle of the wheel chocks 28 is averaged to determine an average incline to gain a more accurate estimate of the ground incline. The data from the inclinometer may be used to determine if the vehicle is within safe operational limits. For example, from historical data, it may be determined that incidents increase dramatically when the ground is determined to be at a 10% grade and above. Consequently, no work is allowed when the vehicle is positioned above 10%.

The inclinometer is powered by the battery and sends a signal indicative of the inclination of the wheel chock 28 to the at least one processor 54.

In some embodiments, the at least one processor 54 accesses computer-executable instructions and determines the percent grade of the ground. When the ground is determined to be at greater than 10%, an alert is sent to an indicator in the cab of the utility vehicle 20, to a mobile device, and/or the wheel chock 28 itself activates an alarm indicating that the utility vehicle 20 is out of specification. In some embodiments, the boom assembly 14 may be rendered inoperable by the controller until the situation is corrected.

As described above, in some embodiments, notifications, alerts, and alarms may be provided when the at least one processor 54 of the wheel chock 28 compares the information indicative of the load to specification information and determines that a measurement does not fall within specification limitations. The at least one processor 54 may access the database and compare measurements to historical information and stored limits to confirm that the determined loads are within limits. If the loads exceed the specified limits, an alarm may be triggered at the wheel chock 28 or an alert may be sent to the cab of the utility vehicle 20, a remote location, and/or a mobile device of the operator.

Figure 5:
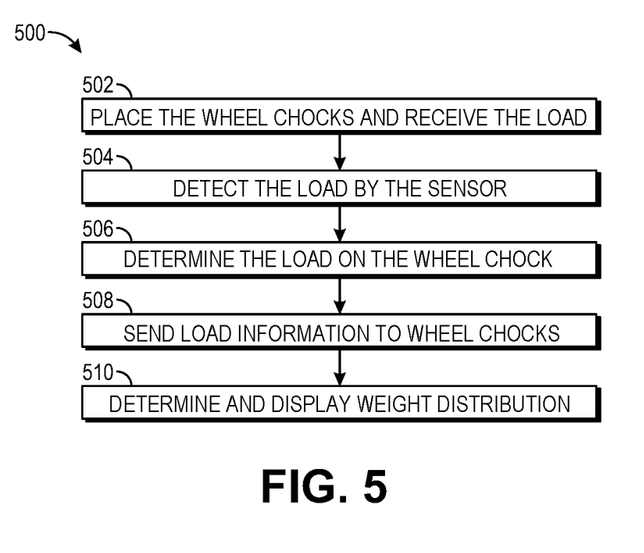
FIG. 5 depicts an exemplary flow chart for measuring a load and determining a weight distribution by load sensing wheel chocks.

FIG. 5 depicts an exemplary process of detecting a load from a vehicle imparted on the wheel chocks 28 and determining a load distribution of the utility vehicle 20 on the wheel chocks 28 generally referenced by the numeral 500. At step 502, the wheel chock 28 is placed under the tire 26 of the utility vehicle 20. As described above, according to regulatory specifications, the utility vehicle 20 may be placed in park, the wheel chock 28 placed below the tire 26, and the parking brake removed such that the wheel chock 28 prevents the utility vehicle 20 from rolling downhill. The parking brake of the utility vehicle 20 is then re-applied and the outriggers 22 are placed. In some embodiments, the wheel chocks 28 are placed under all tires of the utility vehicle. The wheel chocks 28 may take the downhill load of the utility vehicle 20 such that no, or minimal, lateral forces and torques are imparted on the outriggers 22.

At step 504, the sensor 48 of the wheel chock 28 detects the load imparted on the wheel chock 28 from the utility vehicle 20. In some embodiments, the sensor 48 may be a load sensor and detect the load imparted by the utility vehicle 20. The sensor 48 may send a first signal indicative of the load to the at least one processor 54. In some embodiments, the sensor 48 may be any force measuring sensor such as, for example, a load cell, a strain gauge, a pressure transducer, a displacement measurement sensor, and any other load measuring device.

At step 506, a first signal indicative of the load is sent from the sensor 48 is received at the at least one processor 54. The at least one processor 54 may execute computer-executable instructions to determine the load imparted on the wheel chock 28. Further, the at least one processor 54 may be configured to control actuators of the aerial device 10, send alerts, sound alarms, display information via the display 38, and perform any other operations as described in embodiments above.

At step 508, a second signal indicative of the load on the wheel chock 28 is sent to a second wheel chock comprising a receiver and a display. The wheel chocks 28 may comprise transmitters and receivers for communicating wirelessly. Any or all of the wheel chocks 28 may display the information indicative of the loads on the wheel chocks 28.

At step 510, a weight distribution of the utility vehicle 20 imparting weight on the wheel chocks 28 is determined. The load on the wheel chocks 28 may be determined and displayed at the wheel chock 28. The operator may view the display 38 of the wheel chock 28 and easily see the load distribution across all wheel chocks 28.

Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. A wheel chock system for supporting a vehicle and measuring a load imparted on the wheel chock system by the vehicle, the wheel chock system comprising:
   a first wheel chock, comprising:
      a surface for receiving a first tire of the vehicle and supporting the vehicle;
      a first sensor for measuring a first load on the first wheel chock imparted by the vehicle; and
      a display on a first side of the first wheel chock displaying information indicative of the first load;
   a second wheel chock for receiving a second tire of the vehicle;
   the second wheel chock comprising:
      a second sensor measuring a second load imparted by the vehicle; and
      a transmitter for transmitting information indicative of the second load to the first wheel chock.

2. The wheel chock system of claim 1, wherein the display of the first wheel chock displays the information indicative of the second load transmitted from the transmitter of the second wheel chock.

3. The wheel chock system of claim 1, wherein the surface is curved and comprises raised projections for increasing friction.

4. The wheel chock system of claim 1, further comprising at least one processor at the first wheel chock configured to receive the information indicative of the second load from the transmitter of the second wheel chock.

5. The wheel chock system of claim 4, wherein the at least one processor is further configured to activate an alarm when the second load is below a predetermined specification.

6. The wheel chock system of claim 1, wherein the first sensor or the second sensor comprises a load cell, a strain gauge, a pressure transducer, or a displacement measurement sensor.

7. A wheel chock system for supporting a vehicle and measuring a load imparted on the wheel chock by the vehicle, the wheel chock system comprising:
   a plurality of wheel chocks, each wheel chock of the plurality of wheel chocks comprising:
      a sensor for measuring the load imparted by the vehicle on each wheel chock;
      at least one processor for receiving a first signal from the sensor and determining a load on each wheel chock of the plurality of wheel chocks; and
      a transmitter for transmitting a second signal indicative of the load determined by the processor;
   a receiver for receiving the second signal indicative of the load; and
   at least one display for displaying the load measured at each wheel chock of the plurality of wheel chocks, wherein the at least one display is disposed on a first side of at least one wheel chock of the plurality of wheel chocks.

8. The wheel chock system of claim 7, wherein the at least one display comprises a plurality of displays, wherein each wheel chock of the plurality of wheel chocks comprises one of the plurality of displays.

9. The wheel chock system of claim 8, wherein each display provides information indicative of the load on each wheel chock.

10. The wheel chock system of claim 7, wherein the at least one display comprises a second display disposed on at least one of a mobile device, a utility vehicle, and a remote location, wherein the second display is configured to display information indicative of the load imparted by the vehicle.

11. The wheel chock system of claim 7, wherein the at least one processor is further configured to activate an alarm when the measured load of any of the wheel chocks does not meet regulatory specifications.

12. The wheel chock system of claim 11, wherein the at least one display is further configured to display a comparison of the load on the wheel chocks to the regulatory specifications.

13. A method of supporting a vehicle on a slanted surface, the method comprising the steps of:
providing a first wheel chock comprising: a first surface for receiving a first tire thereon; and a first sensor for measuring a first load on the first wheel chock;
placing the first surface adjacent the first tire of the vehicle;
detecting the first load imparted by the vehicle using the first sensor, sending a first signal indicative of the first load from the first sensor to at least one processor;
sending a second signal comprising information indicative of the first load from the at least one processor to a display;
providing a second wheel chock comprising: a second surface for receiving a second tire of the vehicle and measuring, by a second sensor, a second load imparted by the vehicle;
transmitting, by a transmitter, information indicative of the second load from the second wheel chock to the first wheel chock; and
displaying the information indicative of the first load and the information indicative of the second load on the display.

14. The method of claim 13, wherein the display is disposed on the first wheel chock.

15. The method of claim 14, wherein a second display is disposed on the second wheel chock, further comprising:
displaying the information indicative of the second load on the second display.

16. The method of claim 14, further comprising the steps of:
determining, by the at least one processor, a load distribution from the information indicative of the first load and the information indicative of the second load; and
displaying, by the display, the load distribution.

17. The method of claim 13, further comprising the step of sending an alert to at least one of a mobile device, an alarm at the vehicle, and an alarm at a remote location.

18. The system of claim 5, wherein the at least one processor is further configured to send an alert to at least one of a mobile device, an alarm at the vehicle, and an alarm at a remote location.

19. The system of claim 7, wherein the sensor comprises a load cell, a strain gauge, a pressure transducer, or a displacement measurement sensor.

20. The method of claim 13, wherein the first sensor or the second sensor comprises a load cell, a strain gauge, a pressure transducer, or a displacement measurement sensor.

* * * * *